United States Patent [19]

Koch

[11] 4,017,778

[45] Apr. 12, 1977

[54] MOTOR PROTECTION CIRCUIT

[75] Inventor: Erich O. Koch, King of Prussia, Pa.

[73] Assignee: Robertshaw Controls Company, Richmond, Va.

[22] Filed: Sept. 6, 1974

[21] Appl. No.: 503,813

[52] U.S. Cl. .............................. 318/473; 318/481; 318/484; 361/27

[51] Int. Cl.² ..................................... H02H 5/04

[58] Field of Search .......... 318/471, 473, 481, 484; 317/22, 40, 41, 42

[56] References Cited

UNITED STATES PATENTS

| | | | |
|---|---|---|---|
| 3,262,014 | 7/1966 | Conner | 318/473 |
| 3,721,880 | 3/1973 | Neill | 318/471 |
| 3,742,302 | 6/1973 | Neill | 317/22 |
| 3,742,303 | 6/1973 | Dageford | 317/22 |
| 3,753,043 | 8/1973 | Plouffe | 317/41 |
| 3,864,611 | 2/1975 | Chang | 318/484 |

OTHER PUBLICATIONS

GE SCR Manual, 1964, pp. 78 & 79.

*Primary Examiner*—Gene Z. Rubinson
*Assistant Examiner*—John J. Feldhaus
*Attorney, Agent, or Firm*—O'Brien & Marks

[57] ABSTRACT

A motor protection circuit includes a capacitance and resistance timing circuit together with temperature sensing facilities which are energized upon motor startup to terminate operation of a motor in the event of insufficient oil pressure or excessive heat. An oil pressure sensing switch is connected to the timing circuit to prevent its operation so long as sufficient oil pressure is sensed.

15 Claims, 1 Drawing Figure

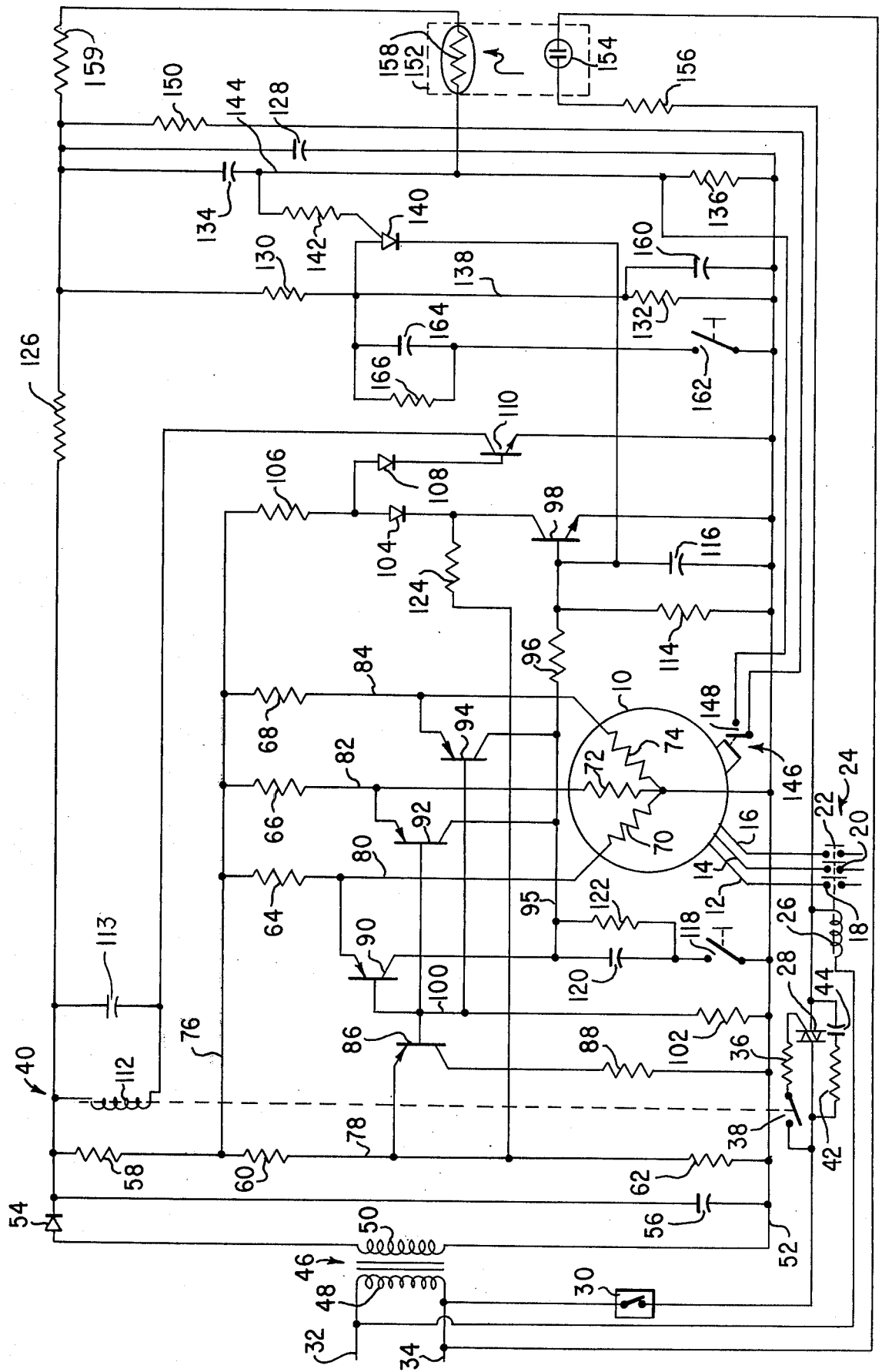

MOTOR PROTECTION CIRCUIT

BACKGROUND OF THE INVENTION

1. Field of the Invention

This invention relates to circuits for terminating operation of a motor when a defective condition, such as excessive winding temperature or loss of lubricating fluid pressure, is sensed. Such circuits are often utilized in refrigeration or air conditioning systems.

2. Description of the Prior Art

The prior art, as exemplified in U.S. Pat. Nos. 2,945,133; 3,014,159; 3,241,001; 3,290,576; 3,329,868; 3,312,081; 3,377,816; 3,404,313; 3,416,060; 3,457,460; 3,660,718; and 3,673,811, contains a number of prior art motor protection circuits including circuits which both sense winding overheat conditions and loss of lubricant fluid pressure to terminate operation of a motor. The prior art circuits generally have many deficiencies such as being unreliable, too expensive, capable of being readily rendered ineffective by taping down a reset switch, and the like.

SUMMARY OF THE INVENTION

The invention is summarized in that a motor protection circuit includes motor power switch means, motor heat sensing means for terminating operation of the motor power switch means in response to an overheated condition unipolarity voltage means, a capacitance, a resistance, said capacitance and said resistance connected in a series timing circuit across the unipolarity voltage means, means responsive to a predetermined charge on the capacitance for terminating operation of the motor power switch means, and lubricating fluid pressure responsive switch means connected to the timing circuit for preventing the charging of the capacitance.

An object of the invention is to construct a motor protection circuit having improved reliability and reduced cost.

Another object of the invention is to minimize the number of relays and the like utilized in motorprotection circuits.

It is also an object of the invention to utilize common circuit components to perform both excessive heat control and oil pressure control.

A further object of the invention is to design a circuit which employs a minimum number of relatively available and inexpensive components.

An advantage of the invention is that highly reliable electronic timing circuitry is combined with heat sensing circuitry in a single motor control circuit.

Other objects and advantages of the invention will become apparent from the following description of the preferred embodiment when taken in conjunction with the accompanying drawings.

BRIEF DESCRIPTION OF THE DRAWINGS

The drawing is a schematic diagram of a circuit in accordance with the invention.

DESCRIPTION OF THE PREFERRED EMBODIMENT

As illustrated in the drawing, the invention is embodied in a control circuit for a motor, such as a three-phase electric motor 10 energized by three-phase power on lines 12, 14 and 16 having series contacts 18, 20 and 22 of a contactor indicated generally at 24. An energization circuit for a winding 26 of the contactor 24 includes a triac 28 and a control switch, such as a thermostat switch 30, connected in series with the triac 28 across power terminals 32 and 34. The gate electrode of the triac 28 is connected by a resistance 36 in series with contacts, such as sealed reed contacts 38, of a relay indicated generally at 40 to the power terminal 34. A series resistance 42 and capacitance 44 are connected across the triac 28 to form a snubbing network for the triac 28.

A step down transformer indicated generally at 46 has a primary winding 48 connected across the terminals 32 and 34 and has a secondary winding 50 connected at one end to a common terminal 52. A diode 54 connects the other end of the secondary winding 50 to one side of a filter capacitance 56 which has its other side connected to the common terminal 52. Resistances 58, 60 and 62 are connected in series across the capacitance 56 to form a voltage dividing circuit. Three resistances 64, 66 and 68 are connected in series with three respective temperature sensing resistances 70, 72 and 74 between the junction 76 between the resistances 58 and 60 and the common terminal 52 to form respective voltage dividing circuits. The temperature responsive resistances 70, 72 and 74 are suitable resistances which increase their resistance values in accordance with increasing temperatures of the motor 10; for example the resistances 70, 72 and 74 may be lengths of positive temperature coefficient wire embedded within respective windings of the motor 10.

The resistances 60, 62, 64, 66, 68, 70, 72 and 74 form a resistance bridge with the terminals 76 and 52 forming power input nodes. The junction 78 between the resistances 60 and 62 forms a first sensing node while the junctions 80, 82 and 84 between the respective resistances 64 and 70, 66 and 72, and 68 and 74 form multiple second sensing nodes. The resistances 60 and 62 form respective first and second arms of the resistance bridge circuit; the resistances 64, 66 and 68 form multiple third arms of the bridge circuit; and the resistances 70, 72, and 74 form multiple fourth arms of the resistances bridge circuit.

A PNP transistor 86 has its emitter electrode connected to the node 78 and its collector electrode connected serially with a resistance 88 to the node 52. PNP transistors 90, 92 and 94 have their emitter electrodes connected to the respective nodes 80, 82 and 84 while the collector electrodes of the transistors 90, 92 and 94 are joined together at a junction 95 which is connected by a resistance 96 to the base electrode of a NPN transistor 98. The base electrodes of the transistors 86, 90, 92 and 94 are joined together in a junction 100 which is connected by a bias resistance 102 to the common terminal 52.

The transistor 98 has its collector and emitter electrodes connected in series with a diode 104 and a resistance 106 across the terminals 76 and 52. The junction between the resistance 106 and the diode 104 is connected by diode 108 to the base electrode of a NPN transistor 110 which has its emitter and collector electrodes connected in series with a winding 112 of the relay 40 across the capacitance 56. A relay chatter elimination capacitance 113 is connected across the winding 112. A bias resistance 114 and a filter capacitor 116 are connected in parallel across the base emitter junction of the transistor 98. A normally open manual reset switch 118 is connected in series with a capacitance 120 to the junction 95. A bleed discharge resistance 122 is connected across the capacitance 120.

A differential resistance 124 is connected between the collector electrode of the transistor 98 and the node 78.

A voltage dropping resistance 126 is connected in series with a filter capacitance 128 across the capacitance 56. A voltage dividing circuit including series resistances 130 and 132 and a timing circuit including a capacitance 134 connected in series with a resistance 136 are connected in parallel across the capacitance 128. The junction 138 between the resistances 130 and 132 is connected to the anode electrode of a PNPN trigger device such as a programmable unijunction transistor (PUT) 140. The gate electrode of PUT 140 is connected by a resistance 142 to the junction 144 between the capacitance 134 and the resistance 136. The cathode electrode of the PUT 140 is connected to the base electrode of the transistor 98. The values of the capacitance 134 and the resistance 136 are selected to charge the capacitance 134 to reduce the voltage on junction 144 below junction 138 a predetermined period after activation of the timing circuit.

A lubricating oil pressure responsive switch device indicated generally at 146 has switch contacts 148 connected in series with a resistance 150 across the timing capacitance 134. The lubricating oil pressure responsive switch device 146 is any suitable switch device which senses a sufficient lubricating oil pressure in the motor 10 and/or a compressor associated therewith to close the contacts 148 to deactivate the timing circuit, and which opens the contacts 148 when there is insufficient lubricating oil pressure to activate the timing circuit.

A light responsive or actuated relay 152 has a neon lamp 154 connected in series with a resistance 156 across the triac 28 and the control switch 30. The relay 152 has a light sensitive resistance 158 in proximity to be illuminated by the lamp 154. The resistance 158 is connected in series with a current limiting and protective resistance 159 across the timing capacitance 134 and has a high resistance value when the lamp 154 is dark to activate the timing circuit and a low resistance value when illuminated by the lamp 154 to deactivate the timing circuit.

A filter capacitance 160 is connected across the resistance 132 between the junction 138 and the terminal 52. A manual oil pressure reset switch 162 is connected in series with a capacitance 164 between the terminal 52 and the junction 138. A capacitance bleed discharge resistance 166 is connected across the capacitance 164.

The value of the resistance 88, 96 and 102 are selected to have values substantially larger than the values of the resistances 60, 62, 64, 66, 68, 70, 72, and 74 such as not to produce any substantial loading or voltage change upon the bridge circuit arms. However, the value of the resistance 124 is selected to change the bridge circuit to respond to first and second predetermined motor temperatures when the transistor 98 is conductive and nonconductive, respectively.

In operation of the motor protective control circuit, the relay 40 is normally energized closing the contacts 38 to render the triac 28 conductive. The control switch 30 then controls the energization of the contactor winding 26 operating the contacts 18, 20 and 22 to energize the lines 12, 14 and 16 to the motor 10. In the event of a defective condition such as an excessive temperature in the motor 10 or the loss of lubricating fluid pressure, the relay 40 is de-energized opening the contacts 38 to deactivate the triac 28 and terminate the operation of the contactor 24 to thus de-energize the motor 10 preventing damage thereto.

Under normal operating conditions, the resistance values of the resistances 70, 72 and 74 are low due to the low temperature of the motor 10 to render the voltages on the nodes 80, 82 and 84 less positive than the voltage on the node 78 which is produced by positive current through resistance 60 and resistances 106 and 124 from node 76. Thus the voltage produced upon the junction 100 by current through the emitter-base junction of the transistor 86 is higher than the voltage on the nodes 80 82, and 84 to render the transistors 90, 92 and 94 nonconductive. When the transistors 90, 92 and 94 are nonconductive, the transistor 98 is biased non-conductive by voltage through the resistance 114 making the collector of the transistor 98 positive rendering the transistor 110 conductive. With the transistor 110 conductive, the relay winding 112 is energized to operate the relay 40.

If the temperature sensed by one or more of the temperature responsive resistances 70, 72 and 74 rises above the second predetermined temperature, the voltage on one or more of the nodes 80, 82 and 84 will rise above the voltage on the node 78 which will thus render the emitter-base junction of the respective transistor or transistors 90, 92 and 94 conductive producing a positive voltage on the junction 95. The base of the transistor 98 will be driven positive rendering the transistor 98 conductive which lowers the voltage on the base of the transistor 110 rendering it non-conductive to terminate the energization of the relay 40.

When the transistor 98 is rendered conductive the resistance 124 is effectively connected in shunt with the resistance 62. Positive current from node 78 through the resistance 124 subtracts from the current through resistance 60 to lower the voltage on the node 78. Thus the temperature of all the temperature responsive resistances 70, 72 and 74 will have to drop below a first predetermined temperature, which substantially less than the second predetermined temperature, before the voltages on all the nodes 80, 82 and 84 will drop below the voltage of the node 78 to restart the motor 10. The time required for the motor 10 to cool from the second predetermined temperature down to the first predetermined temperature provides a delay which may allow a defective condition to correct itself; refrigeration motors are often prevented from starting by an excessive pressure in the refrigerant compressor, and such a delay allows sufficient time for the refrigerant pressure to bleed off.

The emitter-base junction of the transistor 86 renders the bridge circuit substantially less subject to variation due to ambient temperature change. The temperature change of the emitter-base junction of the transistor 86 will match the temperature change of the emitter-base junctions of the transistors 90, 92 and 94 to thus render the bridge circuit relatively insensitive to ambient temperature change.

The temperature sensing circuit may be reset by closing the manual switch 118 which connects the capacitance 120, in a discharged state, across the junctions 95 and 52. The discharged capacitor 120 momentarily lowers the voltage on the base of the transistor 98 to the voltage on common terminal 52 to render the transistor 98 non-conductive to initiate energization of the relay 40. The capacitance 120 will eventually charge returning the circuit to the control of the temperature sensing bridge, thus preventing the taping down or permanently closing of the switch 118 to by-pass the temperature responsive circuit. Any charge on the capacitance 120 after opening of the switch 118 will bleed off through the resistance 122.

When the control switch 30 is open or the triac 28 is de-energized, the lamp 154 of the light responsive relay 152 is energized to illuminate the light sensitive resistance 158. The low resistance value of the illuminated light sensitive resistance 158 and the resistance 159 shunts the capacitance 134 preventing any substantial charging of the capacitance 134.

When both the control switch 30 is closed and the triac 28 is conductive, the lamp 154 is shunted and thus dark to return the light sensitive resistance 158 to its high resistance state thus removing the shunt across the capacitance 134. The capacitance 134 is allowed to charge to produce a decreasing voltage on the node 144 relative to the voltage across the capacitance 128. Under normal operating conditions with the motor 10 energized, the oil pressure sensing switch 146 closes the contacts 148 before the expiration of the predetermined period to connect the resistance 150 in shunt across the timing capacitance 134 to prevent the capacitance 134 from charging to a voltage greater than the voltage across the resistance 130.

In the event the oil pressure switch 146 senses insufficient oil pressure for the motor 10, the contacts 148 open to allow the capacitance 134 to charge to produce a voltage on the junction 144 below the voltage on the junction 138. When the voltage on the junction 144 reaches the triggering voltage of the PUT 140, the PUT 140 becomes conductive which applies a positive voltage to the base of the transistor 98 thus de-energizing the relay 40 to terminate energization of the motor 10. The PUT 140 once rendered conductive is maintained in conduction by the current through the resistance 130, the anode and cathode electrodes of the PUT 140 and the resistance 114.

The oil pressure responsive circuit is reset by closing the oil pressure reset switch 162 to connect the capacitance 164 between the junctions 138 and 52. This momentarily shorts the anode and cathode electrodes of the PUT 140 to interrupt the current through the PUT 140 to render the PUT non-conductive. Since the capacitance 134 will have discharged through resistances 158 and 159 after deactivation of triac 28, the motor 10 will be allowed to start at least for another timing period of charging the capacitance 134. The capacitance 164 will eventually charge up if the switch 162 is not released to return the circuit to the control of the charge on the capacitance 134; this prevents the switch 162 from being taped in the closed position to override the protective feature of the oil pressure sensing circuitry. If the cause of the insufficient oil pressure has not been corrected, the motor 10 will again be stopped to prevent damage thereto.

Intermittent operation of the oil pressure switch 146 will also terminate operation of the motor 10 if the total time that the contacts 148 are open has a magnitude relative to the total time that the contacts 148 are closed adequate to allow the charge of the capacitance 134 to exceed the discharge through resistance 150 sufficiently to lower the voltage on junction 144 below the voltage on junction 138.

The employment of the electronic timing circuit which is shunted by the oil pressure responsive switch to control the transistor 98 along with the heat sensing bridge also controlling the transistor 98 provides a simple and convenient unitary circuit for protecting motors. The unitary circuit utilizes a minimum number of reliable readily available and relatively inexpensive components to produce a circuit which protects the motor 10 against damage due to excessive temperature of its windings or loss of oil pressure.

Since many modifications, changes in detail and variations may be made to the above described embodiment, it is intended that all matter within the foregoing description or shown in the accompanying drawing be interpreted as illustrative and not in a limiting sense.

What is claimed is:

1. A motor protection circuit comprising
   motor power switch means,
   motor heat sensing means for terminating operation of the motor power switch means in response to an overheated condition,
   unipolarity voltage means,
   a first capacitance,
   a first resistance,
   said first capacitance and said first resistance connected in a series timing circuit across the unipolarity voltage means,
   means including a voltage responsive semiconductor device responsive to a predetermined charge on the first capacitance for terminating operation of the motor power switch means,
   lubricating fluid pressure responsive switch means connected to the timing circuit for preventing the charging of the first capacitance,
   a series reset circuit including a second capacitance and a normally open reset switch means connected to the voltage responsive semiconductor device, and
   means including a second resistance connected across the second capacitance to bias the second capacitance to a predetermined condition sufficient to temporarily disable the means for terminating the operation of the motor power switch means when the reset switch means is closed but insufficient to maintain the disablement of the means for terminating operation of the motor power switch means when the reset switch means is held closed.

2. A motor protection circuit as claimed in claim 1 wherein the means responsive to a predetermined charge includes
   a voltage dividing circuit including third and fourth resistances connected in series across the unipolarity voltage means, and
   the voltage responsive semiconductor device has inputs connected between a junction of the first resistance and the first capacitance and a junction of the third and fourth resistances,
   said voltage responsive semiconductor device having an output for controlling the motor power switch means.

3. A motor protection circuit as claimed in claim 2 wherein
   the lubricating fluid pressure responsive switch means includes a fifth resistance and normally open contacts which are closed when sufficient pressure is sensed, said fifth resistance and normally open contacts being connected across the first capacitance.

4. A motor protection circuit as claimed in claim 1 wherein
the motor heat sensing means includes a temperature responsive resistance, and
the motor power switch means includes a semiconductor switch means having an input controlled by the motor heat sensing means when the temperature responsive resistance senses a predetermined temperature.

5. A motor protection circuit as claimed in claim 4 wherein the means responsive to a predetermined charge also operates the semiconductor switch means.

6. A motor protection circuit as claimed in claim 1 wherein
the voltage responsive semiconductor device is a PNPN semiconductor device, and
the series reset circuit is connected across the PNPN semiconductor device for terminating current flow through the PNPN semiconductor device.

7. A motor protection circuit as claimed in claim 1 wherein the motor heat sensing means includes first and second parallel voltage dividing circuits,
said first voltage dividing circuit including third and fourth serially connected resistances,
said second voltage dividing circuit including fifth and sixth serially connected resistances,
one of said third, fourth, fifth and sixth resistances being a temperature responsive resistance capable of changing resistance in accordance with the temperature of the motor, and
voltage responsive semiconductor means having inputs connected between a junction of the fifth and sixth resistances and a junction of the third and fourth resistances,
said voltage responsive semiconductor means having an output for operating the motor power switch means.

8. A motor protection circuit comprising
motor power switch means,
unipolarity voltage means,
a first capacitance,
a first resistance,
said first capacitance and said first resistance connected in a series timing circuit across the unipolarity voltage means,
means responsive to a predetermined charge on the first capacitance for terminating the operation of the motor power switch means,
lubricating fluid pressure responsive switch means connected to the timing circuit for preventing the charging of the first capacitance,
a first voltage dividing circuit including second and third serially connected resistances,
a second voltage dividing circuit including fourth and fifth serially connected resistances,
one of said second, third, fourth and fifth resistances being a temperature responsive resistance capable of changing resistance in accordance with the temperature of the motor,
voltage responsive semiconductor means having inputs connected between a junction of the second and third resistances and a junction of the fourth and fifth resistances,
said voltage responsive semiconductor means having an output for operating the motor power switch means,
a second capacitance,
a sixth resistance connected across the second capacitance, and
normally open reset switch means,
said normally open reset switch means and said second capacitance connected in series across the output of the voltage responsive semiconductor means.

9. A motor protection circuit as claimed in claim 7 wherein the voltage responsive semiconductor device is a first semiconductor device; wherein the means responsive to a predetermined charge includes
a third voltage dividing circuit including sixth and seventh resistances connected in series across the unipolarity voltage means, and
a second voltage responsive semiconductor device having inputs connected between the junction of the first capacitance and the first resistance and the junction of the sixth and seventh resistances; and wherein
the motor protection circuit further includes means connected to outputs of both the first and second semiconductor devices for operating the motor power switch means when either the first or second semiconductor devices senses a respective predetermined voltage.

10. A motor protection circuit comprising
unipolarity voltage means,
a first voltage dividing circuit including first and second resistances connected across the unipolarity voltage means,
a second voltage dividing circuit including third and fourth resistances connected across the unipolarity voltage means,
said fourth resistance being a temperature responsive resistance capable of changing its resistance value in response to changes in temperature of a motor,
a fifth resistance connected at one end to the unipolarity voltage means,
a first semiconductor device connected between the junction of the first and second resistance and the other end of the fifth resistance,
a transistor having a pair of control electrodes connected between the other end of the fifth resistance and the junction of the third and fourth resistances, and
semiconductor switch means connected to an output electrode of the transistor and capable of controlling energization of a motor,
said first semiconductor device having a temperature variation corresponding to the temperature variation of the control electrodes of the transistor to render the motor protection circuit less sensitive to ambient temperature change.

11. A motor protection circuit as claimed in claim 10 wherein the first semiconductor device is a second transistor, and the control electrodes of the second transistor are connected between the junction of the first and second resistances and the other end of the fifth resistance.

12. A motor protection circuit as claimed in claim 10 and including
reset means connected to the output electrode of the transistor for momentarily preventing the transistor from controlling the semiconductor switch means.

13. A motor protection circuit comprising
unipolarity voltage means, a first voltage dividing circuit including first and second resistances connected across the unipolarity voltage means, a second voltage dividing circuit including third and fourth resistances connected across the unipolarity voltage means, a third voltage dividing circuit including fifth and sixth resistances connected across the unipolarity voltage means, said fourth and sixth resistances being temperature responsive resistances capable of changing their resistance values in response to changes in temperature of a motor, a first transistor having its base electrode and its emitter electrode connected between the junction of the first and second resistances and the junction of the third and fourth resistances, a second transistor having its base electrode and its emitter electrode connected between the junction of the first and second resistances and the junction of the fifth and sixth resistances, and motor power switch means having an input and being capable of controlling energization of a motor, said first and second transistors having their collector electrodes connected to the input of motor power switch means for operating the motor power switch means.

14. A motor protection circuit as claimed claim 13 and including reset means connected across the input of the motor power switch means for momentarily preventing the first and second transistors from operating the motor power switch means.

15. A motor protection circuit as claimed in claim 13 and including a timing circuit having a capacitance and a seventh resistance connected in series with the capacitance across the unipolarity voltage means, a third voltage dividing circuit including eighth and ninth series resistances connected across the unipolarity voltage means, and a PNPN semiconductor device having voltage responsive triggering means connected between the junction of the capacitance and the seventh resistance and the junction of the eight and ninth series resistances, said PNPN semiconductor device having an output electrode connected to the input of the motor power switch means for operating the motor power switch means.

* * * * *